(12) United States Patent
Graham

(10) Patent No.: US 7,588,714 B1
(45) Date of Patent: Sep. 15, 2009

(54) ELASTOMERIC DISPENSING VALVE MANUFACTURE

(75) Inventor: Paul R. Graham, Holland, OH (US)

(73) Assignee: Rexam Closure Systems Inc., Perrysburg, OH (US)

( * ) Notice: Subject to any disclaimer, the term of this patent is extended or adjusted under 35 U.S.C. 154(b) by 376 days.

(21) Appl. No.: 11/598,312

(22) Filed: Nov. 13, 2006

Related U.S. Application Data

(62) Division of application No. 10/252,919, filed on Sep. 23, 2002, now Pat. No. 7,175,413.

(51) Int. Cl.
*B29C 45/43* (2006.01)

(52) U.S. Cl. .............. 264/571; 264/328.1; 264/334; 425/556; 425/577; 425/DIG. 10; 425/DIG. 60

(58) Field of Classification Search .............. None
See application file for complete search history.

(56) References Cited

U.S. PATENT DOCUMENTS

| | | | |
|---|---|---|---|
| 3,680,187 A | 8/1972 | Murray | |
| 3,849,053 A | 11/1974 | Bruce | |
| 4,389,365 A * | 6/1983 | Kudriavetz | 264/297.8 |
| 4,470,347 A | 9/1984 | Sloan | |
| 4,777,977 A | 10/1988 | Platusich | |
| 4,865,793 A | 9/1989 | Suzuki et al. | |
| 4,925,128 A | 5/1990 | Brody | |
| 4,928,645 A | 5/1990 | Berneburg | |
| 4,941,815 A | 7/1990 | Julian | |
| 5,140,748 A | 8/1992 | Kandpal | |
| 5,183,188 A | 2/1993 | Rebeyrolle | |
| 5,234,328 A | 8/1993 | Willson et al. | |
| 5,288,451 A * | 2/1994 | Schad | 264/328.8 |
| 5,306,001 A | 4/1994 | Shishido | |
| 5,380,185 A | 1/1995 | Shishido | |
| 5,409,654 A * | 4/1995 | Platusich | 264/161 |
| 5,421,718 A | 6/1995 | Karisson | |
| 5,447,426 A | 9/1995 | Gessner et al. | |
| 5,503,122 A | 4/1996 | Ritland | |
| 5,569,476 A | 10/1996 | Van Manen et al. | |
| 5,792,402 A | 8/1998 | Rivers | |
| 5,849,344 A | 12/1998 | Eto | |
| 5,868,978 A | 2/1999 | Kadoriku | |
| 5,935,511 A | 8/1999 | Brown | |
| 6,217,808 B1 | 4/2001 | Lacout | |
| 6,363,902 B1 | 4/2002 | Strasser | |
| 6,390,800 B1 | 5/2002 | Brown et al. | |
| 6,409,945 B1 | 6/2002 | Yamamoto | |
| 6,537,053 B1 | 3/2003 | Watkins | |
| 2001/0048185 A1 | 12/2001 | Weder | |
| 2002/0036360 A1 | 3/2002 | Nishimoto | |

* cited by examiner

*Primary Examiner*—Monica A Huson
(74) *Attorney, Agent, or Firm*—Reising Ethington PC

(57) ABSTRACT

A system for molding dispensing valves includes first and second mold sections, at least one of which is movable with respect to the other between a closed position in which the mold sections form a plurality of dispensing valve mold cavities, and an open position in which the mold sections are spaced from each other and the mold cavities are open along a mold parting line. A transfer mechanism is movable between the first and second mold sections in the open positions of the mold sections for receiving molded valves from the cavities and transferring the valves from between the mold sections.

4 Claims, 7 Drawing Sheets

US 7,588,714 B1

ELASTOMERIC DISPENSING VALVE MANUFACTURE

This application is a division of application Ser. No. 10/252,919 filed Sep. 23, 2002 now U.S. Pat. No. 7,175,413.

The present invention is directed to manufacture of dispensing valves of flexible resilient elastomeric material, and more particularly to a mold, a mold system and a method of making elastomeric dispensing valves.

BACKGROUND AND SUMMARY OF THE INVENTION

Dispensing valves of flexible resilient elastomeric material, particularly liquid silicone rubber, are currently finding application in dispensing packages for a wide variety of fluid products such as beverages, food condiments and body lotions. A package and a valve of this type are disclosed, for example, in U.S. Pat. No. 4,749,108. Current technology for manufacturing valves of this type involves stamping the valve from a sheet of resin material when the material is partially cured, so that the valve retains the shape imparted by the stamping operation following separation from the sheet. This technique involves significant waste of material, which cannot be recycled. The valves are coated with talc to prevent the valves from adhering to each other, and the valves are placed in a vibrator bowl for orientation purposes. Valves fed from the bowl, when properly oriented, are placed in closures for securement to containers after filling. It is therefore a general object of the present invention to provide an injection mold, a mold system and a method of making a dispensing valve that reduce the amount of scrap material and simplify handling of the valves as compared with the current technology described immediately above.

An injection mold for making elastomeric dispensing valves in accordance with one aspect of the present invention includes a first mold section having a core plate with at least one core and a stripper plate having at least one core passage in which the core is slidably received. A second mold section has a cavity plate with at least one passage for feeding elastomeric material through the cavity plate. At least one of the first and second mold sections is movable with respect to the other between an open position in which the first and second mold sections are spaced from each other, and a closed position in which the first and second mold sections are in facing engagement to form at least one mold cavity for molding a dispensing valve between the cavity plate on the second mold section, and the stripper plate and an end of the core on the first mold section. The stripper plate has a vacuum passage for selective application of vacuum to the mold cavity and to a dispensing valve molded in the mold cavity.

A system for molding dispensing valves in accordance with a second aspect of the present invention includes a first mold section and a second mold section, at least one of which is movable with respect to the other between a closed position in which the mold sections form a plurality of dispensing valve mold cavities, and an open position in which the mold sections are spaced from each other and the mold cavities are opened along a mold parting line. A transfer mechanism is movable between the first and second mold sections in the open position of the mold sections for receiving molded valves from the cavities and transferring the valves from between the mold sections. The first mold section in accordance with a preferred embodiment of this second aspect of the invention includes a plurality of vacuum passages for selectively applying vacuum to valves in the mold cavities, first to retain the valves in the cavities when the mold sections are separated and then to permit transfer of the valves from the cavities to the transfer mechanism.

A method of making a dispensing valve in accordance with a third aspect of the present invention includes closing a mold having first and second mold sections and at least one mold cavity formed at a parting line between the mold sections. A dispensing valve is injection molded in the cavity, and the mold sections are then separated along the parting line while applying vacuum to the cavity through the first mold section to retain the molded valve on the first mold section. The molded valve is then contacted by a transfer mechanism, and vacuum is applied to the valve through the transfer mechanism and releasing the vacuum applied to the valve through the first mold section. The valve is then removed from the first mold section by the transfer mechanism. In the preferred implementation of this third aspect of the invention, the valve is injection molded of liquid silicone rubber and allowed to cure within the mold cavity prior to separation of the mold sections, so that the valve retains its molded shape during transfer and further processing.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
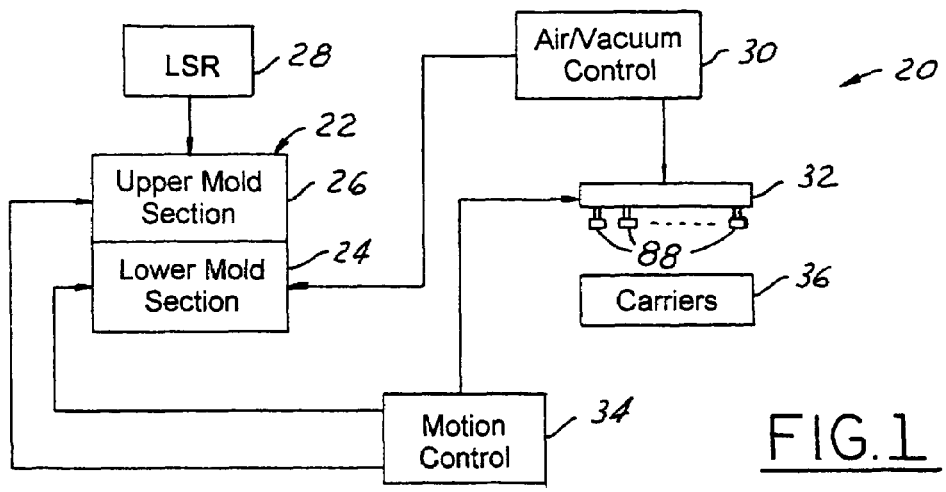
FIG. 1 is a functional block diagram of a mold system for injection molding liquid silicone dispensing valves in accordance with an exemplary presently preferred embodiment of the invention.

FIG. 1 illustrates a mold system 20 in accordance with an exemplary but presently preferred implementation of the invention. Mold system 20 includes an injection mold 22 having a first or lower mold section 24 and a second or upper mold section 26. Upper mold section 26 receives moldable elastomeric material, such as liquid silicone rubber (LSR), from a gated manifold system or cold deck 28, which can be mounted on the upper side of upper mold section 22. An air/vacuum control 30 is coupled to lower mold section 24 and to a valve transfer mechanism 32. Mold sections 24, 26 and transfer mechanism 32 are also connected to a motion control system 34, which may be electrical, hydraulic, pneumatic, or a combination thereof. In general, liquid silicone rubber or other suitable moldable elastomeric material is injected through upper mold section 26 into mold cavities between mold sections 24, 26, and dispensing valves are molded in the mold cavities. The mold sections are then opened by motion control 34, and transfer mechanism 32 is positioned between the open mold sections over the lower mold section. Vacuum is applied to the lower mold section to retain the molded valves on the lower mold section as the upper mold section is raised. When transfer mechanism 32 is positioned over lower mold section 24, vacuum on the valves through lower mold section 24 is released, and vacuum is applied to transfer mechanism 32. Release of the valves from lower mold section 24 may be effected by application of atmospheric air after termination of vacuum application, or more preferably by application of air under pressure to assist pick-up of the valves by transfer mechanism 32. Transfer mechanism 32 is then moved to a position over a plurality of carriers 36, and vacuum is released at the transfer mechanism. Once again, transfer of the valves from transfer mechanism 32 to carriers 36 may be effected by application of air at atmospheric pressure at transfer mechanism 32, or further assisted by application of air under pressure. The valves are transported by carriers 36 for further processing, including formation of one or more dispensing openings in the valve and placement of the valve in a closure or container.

Figure 2A:
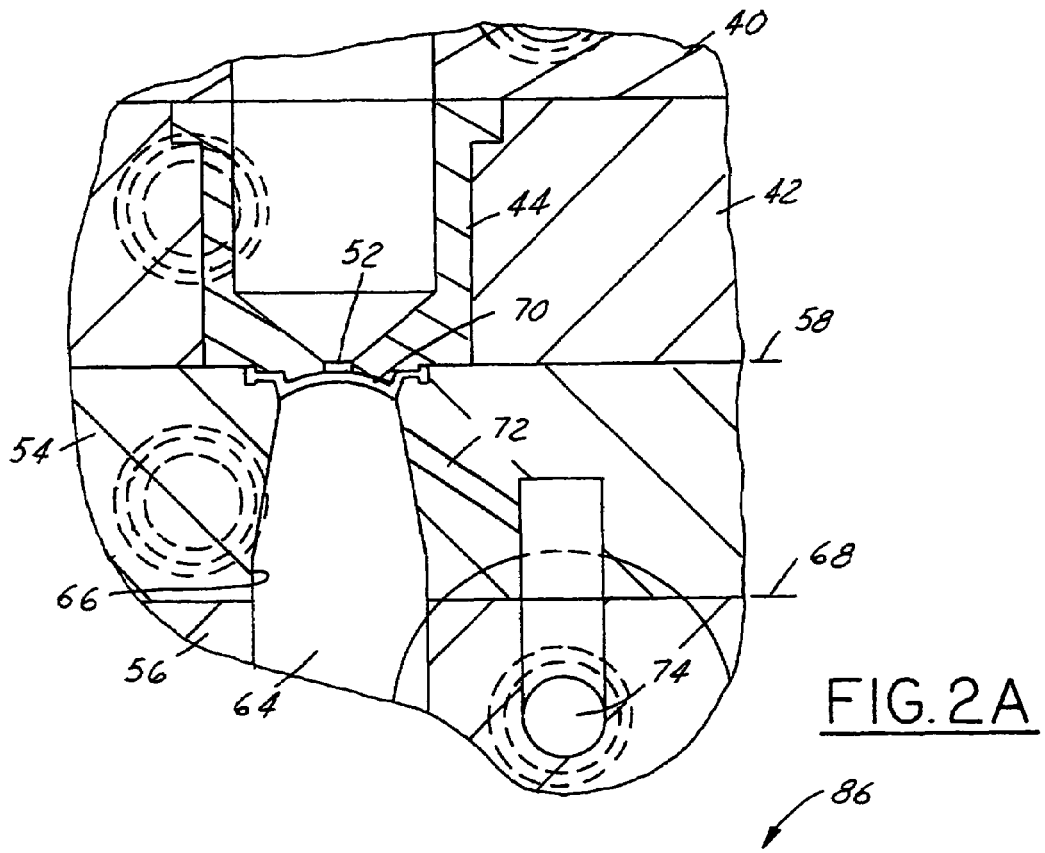
FIG. 2A is an enlarged sectional view of the portion of FIG. 2 within the area 2A.
Figure 2:
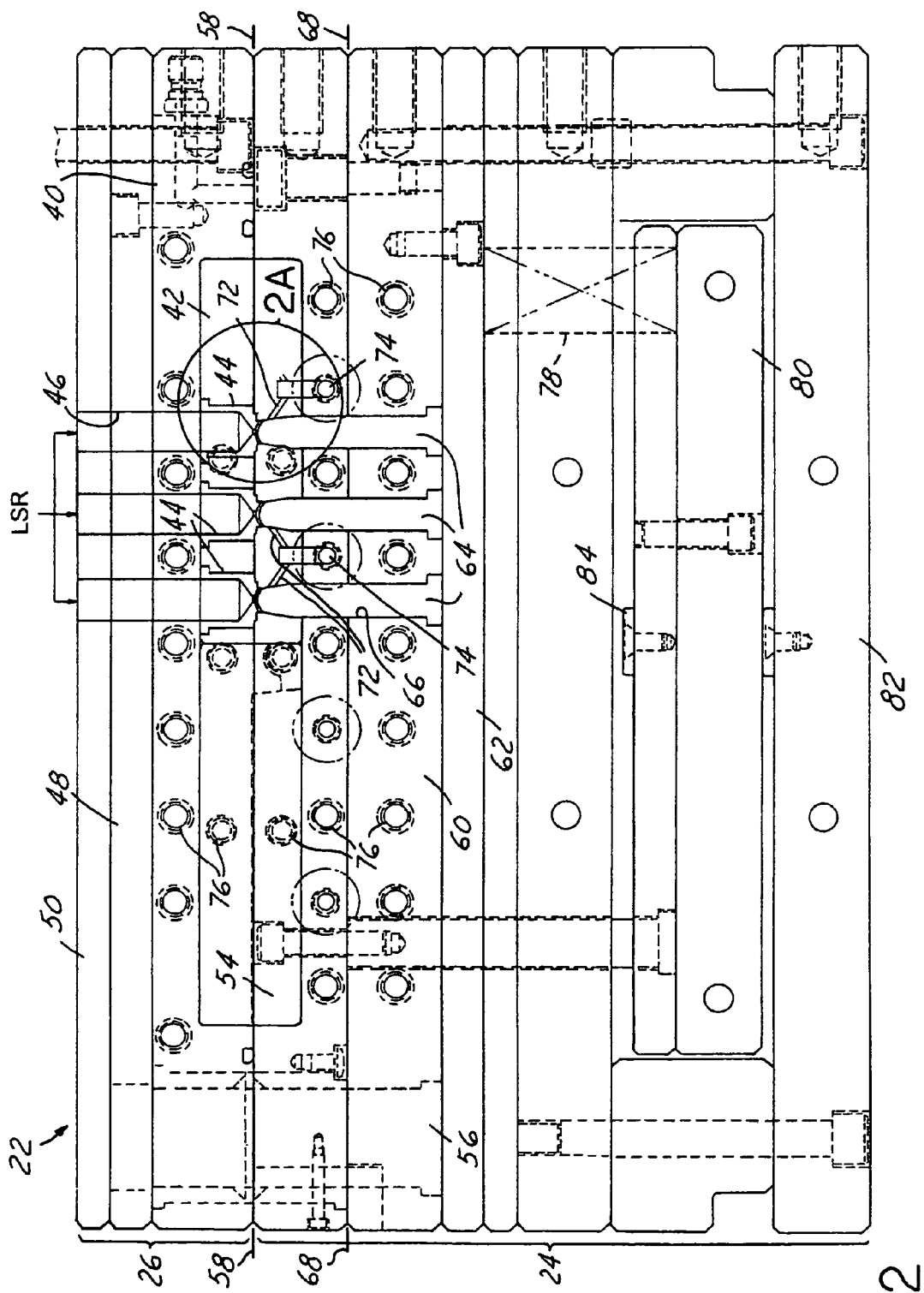
FIG. 2 is an elevational view of the upper and lower mold sections in the system of FIG. 1.

Mold 22 is illustrated in greater detail in FIGS. 2 and 2A. Second or upper mold section 26 includes a cavity plate 40 on which a cavity block 42 is mounted. At least one cavity insert 44, and preferably a plurality of cavity inserts 44, are mounted in a spaced array on cavity block 42. A plurality of passages 46 extend from cavity inserts 44 through cavity plate 40, a cavity backing plate 48 and an insulator board 50 to receive liquid silicone rubber (LSR) (or other suitable elastomeric material) from suitable valve gates on runner system or cold deck 28 (FIG. 1). Each cavity insert 44 includes an opening 52 (FIG. 2A), preferably centrally located on the cavity insert, for feeding the elastomeric material to the associated mold cavity 70 (FIG. 2A), which is defined in part by the lower surface of the cavity insert. (Directional words such as "upper" and "lower" are employed by way of description and not limitation with respect to the orientation of the mold sections illustrated in the drawings.)

First or lower mold section 24 includes a stripper block 54 carried by a stripper plate 56 for opposed facing engagement with cavity block 42 on upper mold section 26 along a first mold parting line 58. A core plate 60 is mounted on a core backing plate 62. At least one mold core 64, and preferably a plurality of mold cores 64, are mounted on and extend upwardly from core plate 60 in a parallel spaced array. Each mold core 64 is slidably received in an associated mold core passage 66 that extends through stripper plate 56 and stripper block 54. Core plate 60 abuts stripper plate 56 along a second mold parting line 68. As best seen in FIG. 2A, a mold cavity 70 is formed at parting line 58 between the lower face of each cavity insert 44, the upper face of each mold core 64 and the upper edge of the inner periphery of each mold core passage 66 in stripper block 54. A vacuum passage 72 is connected to each mold core passage 66 adjacent to the upper end of the mold core passage in stripper block 54. Each vacuum passage 72 is connected through stripper block 54 to a vacuum manifold passage 74 that extends through stripper plate 56, and is connected to air/vacuum control 30 (FIG. 1) through one or more appropriate fittings on stripper plate 56. Heater elements 76 are also carried by core plate 60, stripper plate 56, stripper block 54, cavity block 42 and cavity plate 40 for energization as required to maintain a desired mold temperature. Core backing plate 62 is biased upwardly by a plurality of springs 78 that engage an ejector box 80. Ejector box 80 is mounted on a clamp plate 82, which is secured in fixed position in the preferred implementation of the invention.

Figure 3:
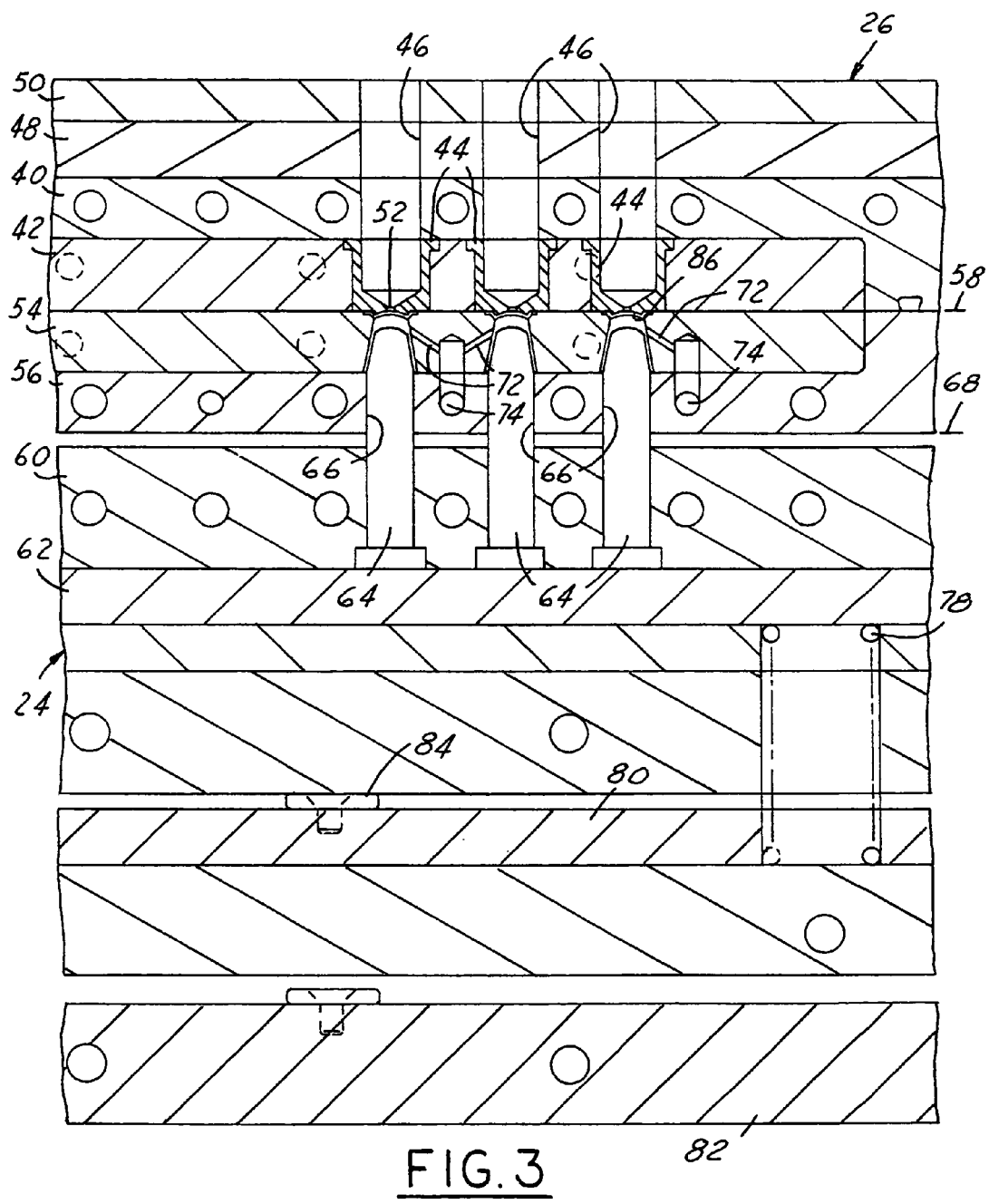
FIG. 3 is a fragmentary sectional view of a portion of the mold in FIG. 2 at an intermediate stage of operation.
Figure 4:
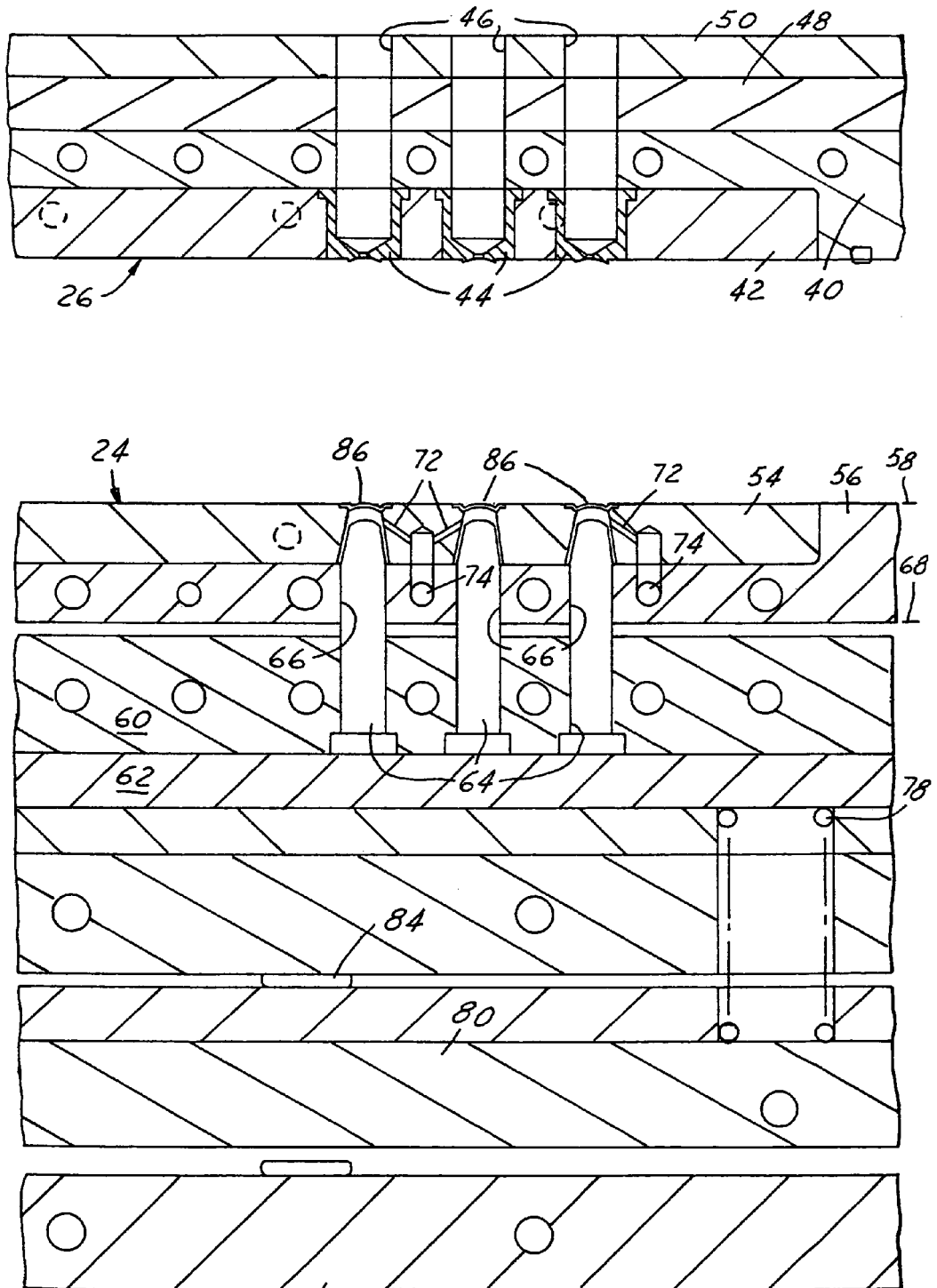
FIG. 4 is fragmentary sectional view of the mold in FIG. 2 at a second intermediate stage of operation.

With mold sections 24, 26 closed against each other as illustrated in FIGS. 1, 2 and 2A and with cores 64, core plate 60 and core backing plate 62 in their fully raised positions illustrated in FIGS. 2 and 2A, elastomeric material such as liquid silicone rubber is injected through passages 46 and cavity inserts 44 into mold cavities 70 formed between the mold sections. The mold sections are maintained at elevated temperature, such as on the order of 320° F., and the valves in the mold cavities are allowed to cure sufficiently so that the valves will retain their shape upon removal from the mold. For liquid silicone rubber, sufficient curing takes place in about eight seconds at 320° F. After this time, core backing plate 62, core plate 60 and cores 64 are lowered to the position illustrated in FIG. 3, in which the core plate subassembly abuts a stop 84 on ejector box 80. Core plate 60 thus separates from stripper plate 56 along mold parting line 68, and pulls mold cores 64 downwardly in associated mold core passages 66. This downward movement of the mold cores couples vacuum passages 72, which were previously blocked by the mold cores, to the valves 86 (FIG. 3) in the mold cavities. Vacuum is applied to passages 72 through manifold passages 74 to retain valves 86 in position. With the molded valves so held in position on lower mold section 24, upper mold section 26 is then moved upwardly to the position illustrated in FIG. 4 to allow access of transfer mechanism 32 (FIG. 1) between the mold sections.

Figure 5:
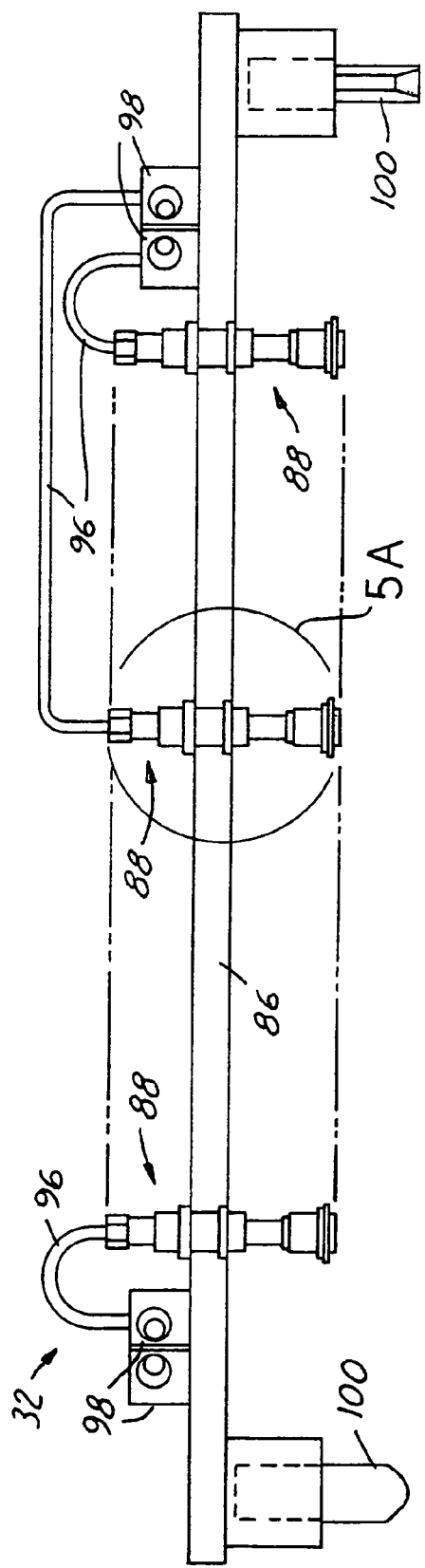
FIG. 5 is a fragmentary elevational view of the valve transfer mechanism illustrated schematically in FIG. 1.
Figure 5A:
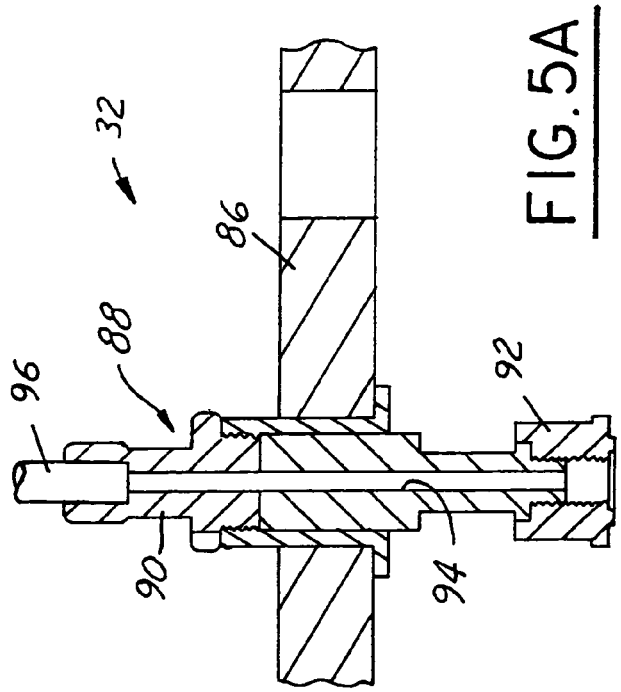
FIG. 5A is an enlarged sectional view of the portion of FIG. 5 within the circle 5A.

Transfer mechanism 32 is illustrated schematically in FIGS. 5 and 5A. A transfer plate 86 carries a plurality of valve grippers 88. Each valve gripper 88 includes a stem 90 and a cup 92 mounted on the lower end of the stem. Each stem and cup have a through passage 94 that is connected by a suitable conduit 96 to one of several vacuum manifolds 98 carried on plate 86. These vacuum manifolds 98 are connected to air/vacuum control 30 (FIG. 1). A plurality of locator pins 100 are positioned on plate 86 for cooperation with corresponding apertures 102 (FIG. 6) in lower mold section 24 for locating the transfer mechanism with respect to the lower mold section during valve transfer.

Figure 6:
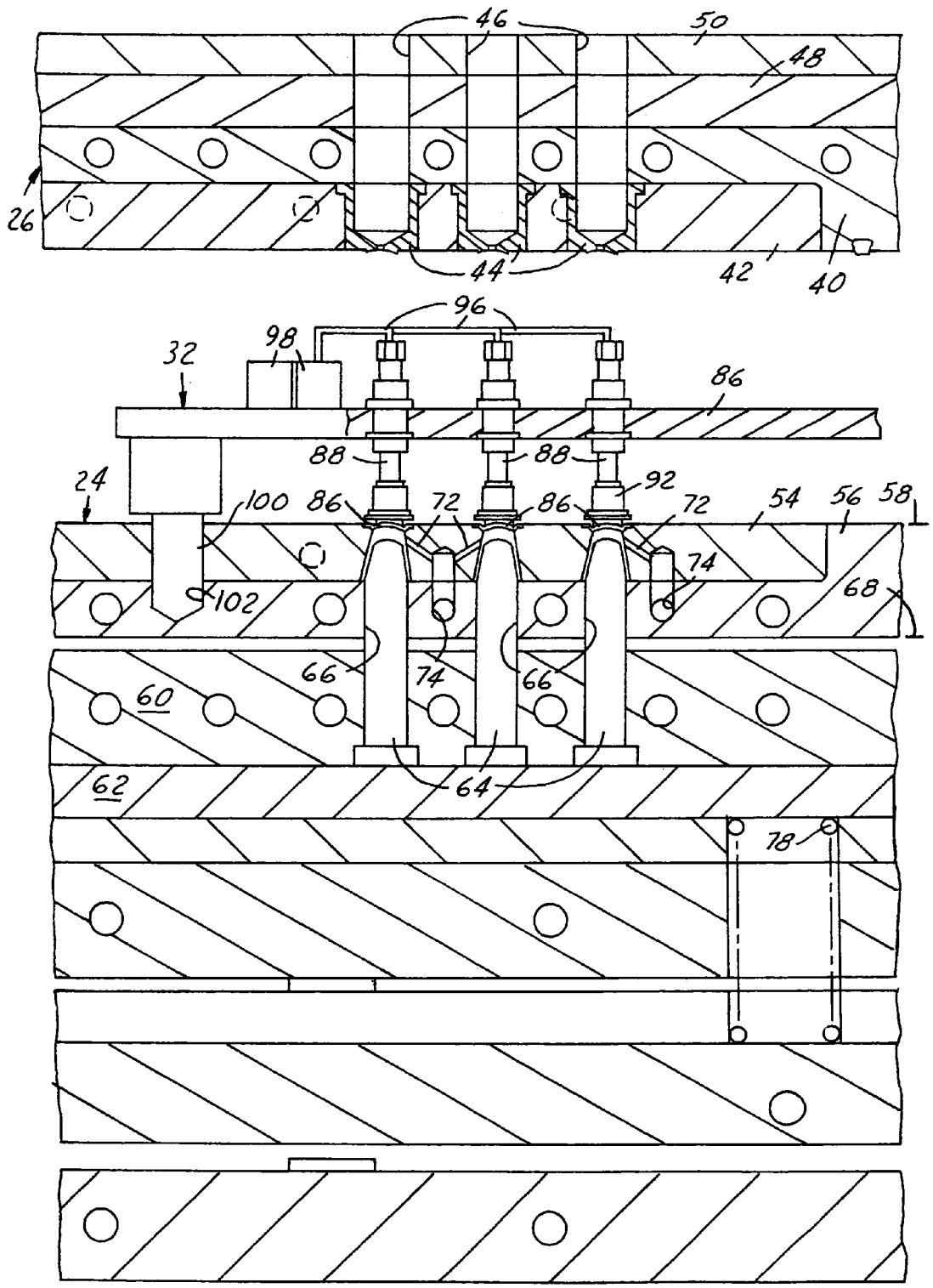
FIG. 6 is a fragmentary sectional view of a portion of the mold and transfer mechanism at a further stage of operation.

Referring to FIG. 6, and with upper mold section 26 fully retracted, transfer mechanism 32 is positioned by motion control 34 (FIG. 1) over the upper face of lower mold section 24. Pins 100 on plate 86 are received in corresponding apertures 102 on lower mold section 24 accurately to locate the transfer mechanism with respect to the lower mold section, so that the cup 92 of each gripper 88 is in facing contact with a corresponding molded valve 86 carried on lower mold section 24 and held on the lower mold section by application of vacuum through passages 72. With the transfer mechanism and grippers so positioned, vacuum is applied by control 30 (FIG. 1) to grippers 88 through manifolds 98 on transfer mechanism 32. At the same time, vacuum is released at vacuum passages 72 in lower mold section 24. This vacuum release may comprise simple connection of the vacuum passages to atmospheric air, thereby releasing the vacuum and allowing the valves to be removed. Such release of vacuum more preferably is accompanied by application of air under pressure to vacuum passages 72 in the lower mold section to cooperate with application of vacuum at the transfer mechanism to assist removal of the valves from the lower mold section. In any event, with the molded valves now held by grippers 88 on transfer mechanism 32, the transfer mechanism is moved by control 34, such as a suitable robot control mechanism, to position the valves over carriers 36 (FIG. 1). Application of vacuum at the transfer mechanism is then terminated to allow the valves to fall by gravity onto associated carriers 36. This valve transfer from mechanism 32 may be assisted by application of air to grippers 88 through manifolds 98 on the transfer mechanism. In the meantime, with the transfer mechanism withdrawn from between the mold sections, the mold sections may be returned to the closed position of FIG. 2, and the cycle repeated.

Figure 7:
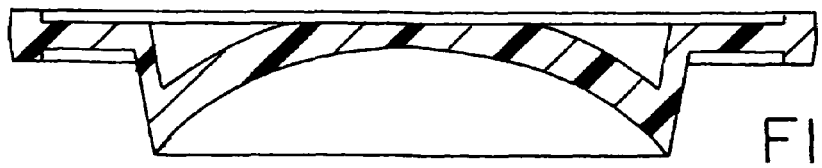
FIGS. 7 and 8 are sectioned elevational views of exemplary dispensing valves molded with the mold system of FIGS. 1-6.
Figure 8:
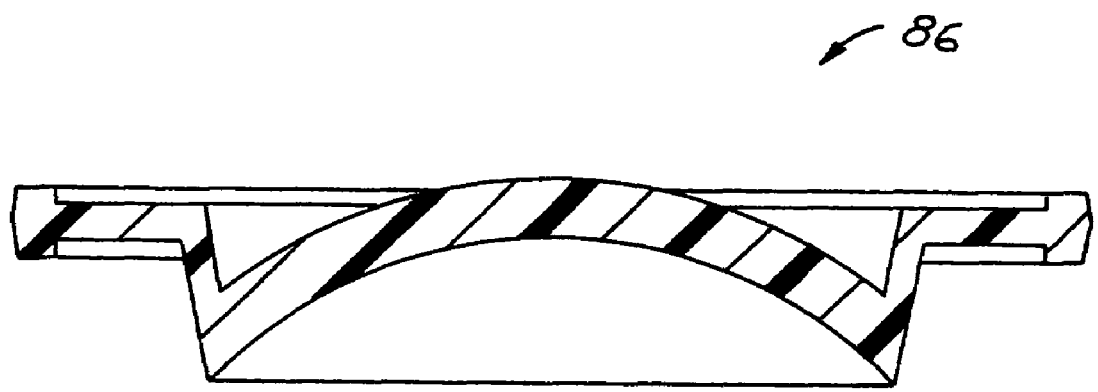

FIGS. 7 and 8 illustrate exemplary dispensing valves 86 that can be fabricated in accordance with the present invention. Valve 86, and use thereof in a dispensing package, is described in greater detail in U.S. Pat. No. 6,672,487 assigned to the assignee hereof. The illustrated geometries of valve 86 are merely exemplary, and other valve configurations can readily be fabricated in accordance with the present disclosure.

The mold, system and method so described possess a number of significant advantages. Waste material is significantly reduced in that the valves are individually molded rather than cut from a sheet. Furthermore, the valves are molded and transferred separately, eliminating any need for application of talc or the like, or use of a vibrator bowl or the like, to separate the valves for application to containers. The valves may be molded in high volume, with each mold 22 containing ninety-six valve mold cavities, for example. Application of vacuum to the lower mold section at the position of FIG. 3 may be monitored to confirm presence of valves in all of the mold cavities. The entire operation can be readily automated with limited operator supervision required. The invention has been described in conjunction with a presently preferred embodiment thereof, and a number of modifications and variations have been discussed. Other modifications and variations will readily suggest themselves to persons of ordinary skill in the art. The invention is intended to embrace all such modifications and variations as fall within the spirit and broad scope of the appended claims.

The invention claimed is:

1. A method of making a dispensing valve that includes the steps of:
 (a) closing a mold having
  a first mold section including a stripper member with a mold core passage and a vacuum passage in communication with said mold core passage and said first mold section further including a mold core slidably received in said mold core passage to block said vacuum passage in a closed position of said mold core, and
  a second mold section including openings for feeding material to at least one mold cavity formed at a parting line between said first and second mold sections,
 (b) injection molding an elastomeric dispensing valve in said at least one mold cavity,
 (c) separating said mold sections along said parting line including retracting said mold core in said mold core passage to unblock said vacuum passage, while applying vacuum to said at least one mold cavity through said vacuum passage of said first mold section to retain said valve on said first mold section,
 (d) contacting said valve by a transfer mechanism,
 (e) applying vacuum to said valve through said transfer mechanism and releasing vacuum applied to said valve through said first mold section, and
 (f) removing said valve from said first mold section.

2. The method set forth in claim 1 wherein said step (b) includes:
 (b1) injecting liquid silicone rubber into said mold cavity, and
 (b2) allowing said valve to cure within said mold cavity.

3. The method set forth in claim 1 further including:
 wherein said steps of applying vacuum to said valve in said step (c) and releasing vacuum to said valve in said step (e) are carried out by selectively applying vacuum to said vacuum passage with said mold core retracted from said stripper member.

4. A method of making an elastomeric dispensing valve that includes the steps of:
 (a) providing an injection mold that includes:
  a first mold section having a core plate with at least one core extending from said core plate and a stripper plate having at least one core passage in which said at least one core is received, and
  a second mold section having a cavity plate with at least one resin passage for feeding elastomeric material through said cavity plate,
  at least one of said first and second mold sections being movable with respect to the other between an open position in which said first and second mold sections are spaced from each other, and a closed position in which said first and second mold sections are in facing engagement to form at least one mold cavity coupled to said at least one resin passage in said second mold section for injection molding a dispensing valve between said cavity plate on said second mold section, and said stripper plate and an end of said at least one core on said first mold section,
  said stripper plate having at least one vacuum passage for selective application of vacuum to said at least one mold cavity and to a dispensing valve molded in said cavity,
  said core plate being movable with respect to said stripper plate to retract said end of said at least one core from said at least one cavity, and
  said vacuum passage in said stripper plate being coupled to said at least one core passage adjacent to said cavity such that said vacuum passage is coupled to said cavity upon retraction of said end of said core from said cavity, said vacuum passage being blocked from said cavity when said end of said core is disposed in said cavity,
 (b) with said first and second mold sections in said closed position, injecting elastomeric material into said mold cavity through said passage to mold a dispensing valve,
 (c) with said first and second mold sections in said open position, moving said core plate to retract an end of said core from said cavity while applying vacuum to said vacuum passage,
 (d) moving a transfer mechanism between said first and second mold sections, and
 (e) terminating application of vacuum at said vacuum passage to release the dispensing valve for pick-up by said transfer mechanism.

\* \* \* \* \*